3,268,032
MEANS FOR AND METHOD OF LUBRICATING
FLEXIBLE CABLE ASSEMBLIES
Avon Dannels, Commerce City, Colo., assignor to Stewart-Warner Corporation, Chicago, Ill., a corporation of Virginia
Filed Feb. 28, 1964, Ser. No. 348,105
4 Claims. (Cl. 184—1)

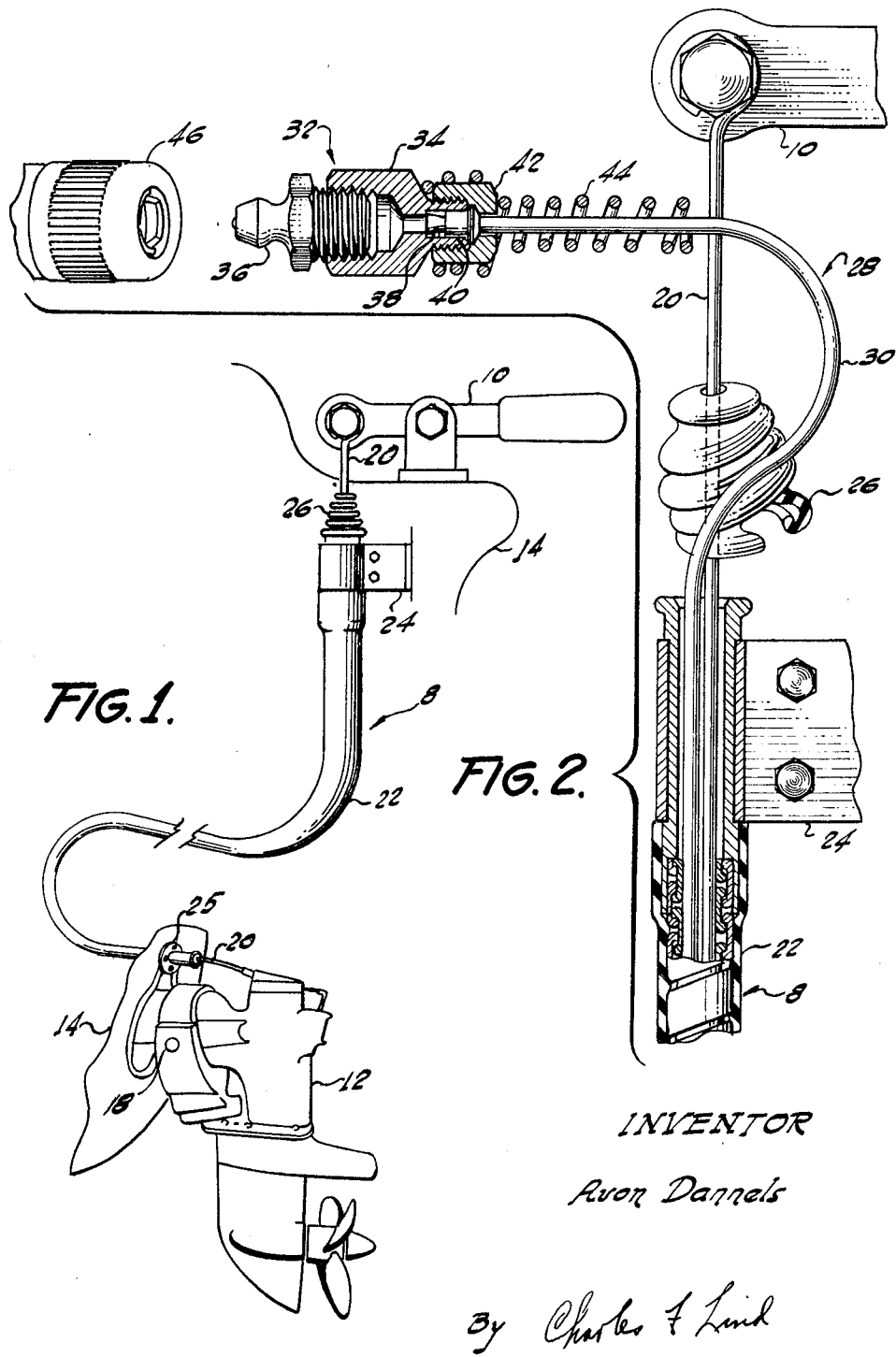

This application relates to an improved means for and method of lubricating flexible cable assemblies or the like having a flexible cable movable within a surrounding flexible casing.

Flexible cable assemblies are commonly used for transferring motion between two separated and movable mechanical elements to affect a control or to transmit power between the elements. A typical cable assembly consists of an outer casing secured at its opposite ends to appropriate frame members adjacent the moving elements, and an inner cable movable within the casing and secured at its ends to the two moving elements. Two basic motions can be transmitted; where the cable moves in an axial direction within the casing, or where it rotates within the casing to transmit torque between the elements. Of particular importance for successful continued use of either type is proper lubrication to minimize the friction drag between the members both for continued smooth operation and for long service life without failure.

Commonly, it is quite difficult to lubricate an installed cable assembly properly and quickly. This is so since the assembly extends for at least several feet between its ends, and furthermore is frequently positioned in tight confinements to make it difficult to lubricate with conventional lubricating equipment. This confinement also makes it impractical if not impossible to remove the assembly from its working environment for thorough lubrication. Consequently, with conventional lubricating equipment, proper cable lubrication is generally so time consuming and costly that it is seldom performed to cause, in effect, marginal lubricated conditions to accelerate wear and failure of the assembly.

Accordingly, an object of this invention is to provide an improved method of, and means for lubricating thoroughly the entire length of a flexible cable assembly with a minimum of effort and an expedient manner without removing the cable assembly from its working environment and, in fact in many cases, without even disconnecting the movable inner cable from its opposite moving elements.

A more detailed object of this invention is to provide an improved method of lubricating a conventional flexible cable assembly consisting of feeding a flexible tubing into the annular clearance space between the inner cable and outer casing and discharging lubricant from the tubing directly into the cable assembly.

Another object of this invention is to provide the structural means for lubricating a flexible cable assembly according to the method of the preceding object.

In order that these and other objects can be more fully appreciated, reference is herein made to the accompanying drawings wherein:

FIG. 1 is a somewhat schematic view of a typical installation of a cable assembly of the type for which this invention is intended; and FIG. 2 is an enlarged view, partially in center section, of the end portion of the cable assembly as shown in FIG. 1, and showing the typical cooperation of a preferred embodiment of the subject lubricator as applied thereto.

FIG. 1, for example, shows a typical push-pull cable assembly 8 connected between a control handle 10 and a propeller assembly 12 of an inboard motor boat 14. The application shown is for raising the propeller assembly 12 from the water by pivoting it about pivot means 18. The cable assembly 8 consists of a cable 20 secured at its opposite ends to the handle 10 and the propeller assembly 12, and an outer casing 22 over at least the intermediate portions of the cable 20 secured at its opposite ends to the boat at brackets 24, 25. The casing 22 is thus fixed at least at its ends to the boat 14 and the inner cable 20 moves relative to the casing upon actuation of the handle 10. Commonly means such as a bellows type rubber cover 26 closes the open end of the casing 22.

FIG. 2 shows the subject lubricator 28 as applied to lubricate the cable assembly 8 disclosed in FIG. 1. Structurally, the lubricator 28 includes a plastic or otherwise pliable tubing 30 that has secured at one of its ends a lubricating fitting 32. As shown, the lubricating fittting 32 includes an adapter shell 34 having a threaded bore at one end to be secured onto a convention male check assembly 36 and a smaller bore 38 at the opposite end for receipt of the one end of the tubing 30. The tubing 30 is held in the bore 38 by conventional means including a bushing 40 fitted snugly over the tubing 30 and biased against the end seat of the adapter shell 34 by threaded cap 42. Helical spring 44 is positioned over the cap 42 and extends axially of the tubing 30 a short distance to prevent kinking of the tubing close to the lubricating fitting 32, where the tubing would normally be subjected to the most strain. A conventional grease gun fitting 46 fits on the check assembly 36 operable thereby to admit a lubricant, such as grease, into the tubing 30.

The end of the tubing 30 remote of the lubricating fitting 32 is adapted to be fitted into the clearance space annularly of the cable 20 within the casing 22. Generally, to lubricate the cable assembly, no more preparation must be made to the assembly than merely to remove the cover 26 (as shown in FIG. 2) to permit the insertion of the tubing 30 into the casing 22 to the length required. After the tubing is in place within the casing, the lubricant is then discharged from the tubing 30 sufficiently to charge the casing 22 as required. It will be noted that since the casing 22 defines a confinement, upon the discharge lubricant filling the casing adjacent the open end (not shown) of the tubing 30, the tubing will be pushed automatically from the casing. If it is desired to charge the casing only partially, the tubing can be withdrawn manually at a more rapid rate than that which would occur by the fluid pressure itself. After the casing has been lubricated to the extent desired, the cover 26 is positioned again in place over the end of the casing.

While the invention has been disclosed to lubricate a push-pull cable control for an inboard power boat, the invention obviously can be used in many other applications. One practical application is the lubrication of control cables on the Volkswagen automobile, such as the control cables for the clutch, the heater, and the accelerator. These cables extend approximately four feet between ends and are closely confined to make it extremely difficult to lubricate them. With the subject invention, it is possible to lubricate the cables by merely sliding back the appropriate dust seal or cover, such as shown at 26 herein, by inserting the tubing 30 into the open end of the casing, and by discharging the lubricant as above mentioned.

It has been found that if the tubing 30 cannot freely be inserted into the casing without binding against the cable already disposed therein, a slight simultaneous manipulation of both the tubing and the cable generally frees the tubing. The amount of lubricant discharged into the cable assembly can be varied as required, merely by regulating the rate of withdrawal of the tubing from the casing. However, it might be cautioned that since the tubing 30 preferably is of plastic and is of limited pressure capacity, excess pressure from the discharging lubricant fitting 46 should be avoided.

While only a single embodiment has been disclosed, it will be obvious to those skilled in the art that modifications can be made therein without departing from the disclosed inventive concept. Accordingly, it is desired that the invention be limited only by the scope of the claims hereinafter following.

What is claimed is:

1. A method of lubricating a flexible cable assembly adapted to be disposed along a non-linear path and having an outer casing and an inner movable cable disposed therein with a limited degree of annular clearance, comprising the steps of inserting to the length required a small diameter flexible tubing capable of following a non-linear path into the open end of the casing adjacent the movable cable therein, and injecting into the opposite end of the tubing a quantity of lubricant to be discharged thereby into the casing.

2. A method of lubricating a flexible cable assembly adapted to be disposed along a non-linear path and having an outer casing and an inner movable cable disposed therein with a limited degree of annular clearance, comprising the steps of inserting to the length required a small diameter flexible tubing capable of following a non-linear path into the open end of the casing adjacent the movable cable therein, and injecting into the opposite end of the tubing a quantity of lubricant and withdrawing simultaneously the tubing from the casing to regulate the degree, if complete or not, of filling the casing with the lubricant as required.

3. For lubricating a flexible cable assembly adapted to be disposed along a non-linear path and including an outer casing and an inner movable cable disposed therein and defining some annular clearance, the improvement being a lubricator comprising flexible tubing means capable of following a non-linear path and of narrow exterior dimension suitable to be inserted at one end into the annular clearance between the cable and the casing, and a lubricating fitting disposed on the opposite end of said tubing means.

4. For lubricating a cable assembly adapted to be disposed along a non-linear path and including an outer casing and an inner movable cable disposed therein and defining some annular clearance, the improvement being a lubricator comprising flexible tubing means capable of following a non-linear path and of narrow exterior dimension suitable to be inserted at one end into the annular clearance between the cable and the casing, a lubricating fitting disposed on the opposite end of said tubing means, and a helical spring mounted on said fitting at one end thereof and surrounding said tubing to prevent buckling of the tubing in the area proximate the lubricating fitting.

References Cited by the Examiner

UNITED STATES PATENTS

| 1,707,145 | 3/1929 | Simmons et al. | 184—105 X |
| 1,824,997 | 9/1931 | Howard | 184—1 |
| 3,144,916 | 8/1964 | Lien | 184—15 X |

FOREIGN PATENTS

| 964,748 | 2/1950 | France. |
| 266,960 | 3/1927 | Great Britain. |

LAVERNE D. GEIGER, *Primary Examiner.*

H. BELL, *Assistant Examiner.*